Patented Oct. 31, 1933

1,933,431

UNITED STATES PATENT OFFICE 1,933,431

WATER-INSOLUBLE AZO-DYESTUFF AND FIBER DYED THEREWITH

Franz Henle and Herbert Kracker, Frankfort-on-the-Main-Hochst, Germany, assignors to General Aniline Works, Inc., New York, N. Y., a corporation of Delaware No Drawing. Application February 6, 1932, Serial No. 591,444, and in Germany May 9, 1930

10 Claims. (Cl. 260—76)

The present invention relates to new water-insoluble azo-dyestuffs and material dyed to fiber.

This application is a continuation-in-part application to our U. S. Patent 1,923,202.

We have found that new valuable water-insoluble azo-dyestuffs are obtainable by combining with a diazotized amine of the benzene-, naphthalene- or anthracene series an aroylene-bis-acetic-acid-arylide of the following general formula:

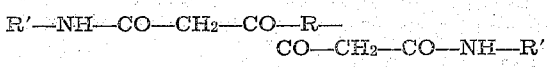

wherein R and R' stand for radicals of the benzene-, naphthalene- or diphenyl- series, the arylide and amine, however, being free from groups which would make the dyestuffs soluble in water, such as the sulfonic acid or carboxylic acid group.

The dyestuffs, thus obtained, yield yellow to red tints and for the greater part have a very good fastness to light.

The hitherto unknown aroylene-bis-acetic-acid-arylides of the following formula:

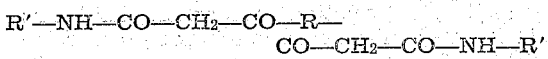

wherein the term "aroylene" means the radical —CO—R—CO— of an aromatic dicarboxylic acid, may be obtained, for instance, by condensing the aroylene bis-acetic acid esters (obtainable by condensation of aromatic dicarboxylic acid chlorides with aceto-acetic acid esters, according to the statements in "Journal für praktische Chemie" vol. 74, pages 124-126, and subsequent acid cleavage) with aromatic amines, for instance, according to the statements in "Annalen der Chemie", vol. 245, page 372, relating to the preparation of benzoyl-acetic acid anilide.

Furthermore, we have found that the said arylides have such an affinity for cotton fiber that, according to the process hereafter described, dyeings are obtained which, as regards intensity and beauty of shade, surpass the dyeings obtained with the corresponding aceto-acetic-acid-mono-arylides.

The aroylene-bis-acetic-acid arylides have such a high affinity for the vegetable fiber that an intermediate drying of the grounded goods is superfluous.

The said arylides, therefore, are useful for developing the dyestuff on the cotton fiber. A large number of the dyeings obtained by developing the said arylides with any diazotized base have a very good fastness to light. Besides, the dyestuffs have a very good fastness to water, chlorine and boiling with soap and sodium carbonate. They are, therefore, of great value for industrial dyeing purposes.

The dyestuffs can be produced on the fiber in the usual manner by dyeing or printing or they can be made in substance or on any of the usual substrata adapted for the production of lakes.

The dyestuffs obtained by this invention are characterized by the following probable general formula:

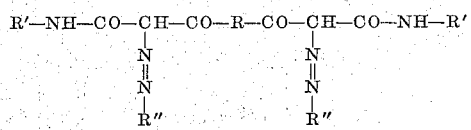

wherein R and R' stand for radicals of the benzene-, naphthalene- or diphenyl-series, R'' stands for a radical of the benzene-, naphthalene- or anthracene-series, the radicals, however, being free from groups which would make the dyestuffs soluble in water.

The following examples serve to illustrate the invention, but they are not intended to limit it thereto:

(1)

*(a) Grounding liquor*

4.1 grams of terephthaloyl-bis-acetic-acid-anilide are dissolved in 10 cc. of alcohol, 2.6 cc. of caustic soda solution of 34° Bé. and 7 cc. of water, and the solution is poured into 10 cc. of Turkey red oil of 50% strength, 8.2 cc. of caustic soda solution of 34° Bé. and 1 liter of water; to the clear solution there are finally added 25 grams of sodium chloride.

*(b) Diazo solution*

1.52 grams of 1-amino-2-methyl-4-nitrobenzene are diazotized in known manner with 2.8 cc.

of hydrochloric acid of 22° Bé. and 0.72 gram of sodium nitrite dissolved in water. The clear diazo-solution is rendered neutral to Congo paper by means of about 2 grams of crystallized sodium acetate and the whole is made up to 1 liter.

(c) Dyeing prescription 50 grams of well-boiled cotton yarn are dried and treated for half-an-hour at 30° C. to 40° C. with the grounding liquor, well squeezed or hydro-extracted and then developed for half-an-hour in the diazo-solution. The material is then well rinsed, soaped at boiling temperature, rinsed again and dried.

There is obtained a vivid greenish yellow of a very good fastness to light. It also shows a very good fastness to boiling lye, for example, when 50 grams of the dyed material are boiled for 6 hours with 5 cc. of caustic soda solution of 40° Bé. in 500 cc. of water.

(b) Diazo printing color 14.2 grams of 1-amino-2-methyl-5-chlorobenzene are diazotized with 26 cc. of hydrochloric acid of 22° Bé. and 7.2 grams of sodium nitrite dissolved in water, with addition of ice. The whole is made up to 500 cc. and thickened with 470 grams of tragacanth (60:1000) and then rendered neutral to Congo paper by means of 30 grams of crystallized sodium acetate.

(c) Printing prescription

The cotton fabric is padded with the grounding liquor, dried and then printed with the diazo-printing color. The material is then washed and soaped at boiling temperature.

There is obtained a vivid greenish yellow of very good fastness to chlorine, to boiling lye as defined in Example 1 and to light.

The dyestuff has the following probable formula:

The dyestuffs has the following probable formula:

(2)

(a) Grounding liquor 20 grams of terephthaloyl-bis-acetic-acid-4-chloro-2-methyl-1-anilide are dissolved in 50 cc. of alcohol, 11 cc. of caustic soda solution of 34° Bé. and 35 cc. of water and the solution is poured into 20 cc. of Monopol Brilliant Oil, 40 cc. of caustic soda solution of 34 Bé. and 900 cc. of water; to the clear solution 25 grams of sodium chloride are added.

40.4 grams of terephthaloyl-bis-acetic-acid-paratoluidide are dissolved in 100 cc. of hot 2 N-caustic soda solution and water. Into this solution there is run a diazo solution prepared as follows: 33.6 grams of 1-amino-4-methoxy-2-nitrobenzene are diazotized in the usual manner with 52 cc. of hydrochloric acid of 22° Bé. and 14.4 grams of sodium nitrite, with addition of ice. The diazo-solution is rendered neutral to Congo paper by means of sodium acetate.

After stirring for some hours, the formation of the dyestuff is finished; it is filtered by suction and forms an orange paste of a very good fastness to light. The dyestuff has the following probable formula:

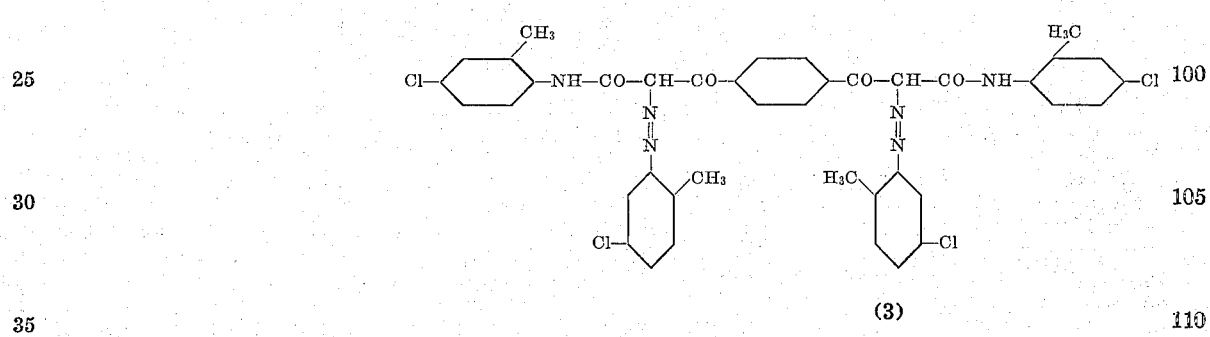

By using as coupling components any other aroylene-bis-acetic-acid arylides and as diazotizing components any other amine, dyestuffs are obtainable which, likewise, are partly distinguished by a very good fastness to light.

The following table indicates a number of dyestuffs obtainable according to the present process but does not comprise all possibilities for the preparation of dyestuffs of very good fastness to light by using other coupling components and other amines, which components, however, must be free from groups which would render the dyestuffs soluble in water; it, therefore, is not intended to limit the invention to the dyestuffs mentioned therein:

| | Diazotizing component | Coupling component | Tint |
|---|---|---|---|
| (1) | 1-amino-2-methoxy-4-nitrobenzene. | Terephthaloyl-bis-acetic-acid-ortho-toluidide. | Vivid medium yellow. |
| (2) | 1-amino-4-methyl-2-nitrobenzene. | Terephthaloyl-bis-acetic-acid-ortho-chloranilide. | Covered reddish yellow. |
| (3) | α-amino-anthraquinone. | Terephthaloyl-bis-acetic-acid-para-anisidide. | Covered orange. |
| (4) | 2.5 dichloraniline. | Terephthaloyl-bis-acetic-acid-α-naphthylamide. | Reddish yellow. |
| (5) | 1-amino-4-chloro-2-nitrobenzene. | Terephthaloyl-bis-acetic-acid-β-naphthylamide. | Very reddish yellow. |
| (6) | 2.5-dichloraniline. | Terephthaloyl-bis-acetic-acid-2.5-dichlor-anilide. | Brownish yellow. |
| (7) | 1-amino-4-methyl-2-nitrobenzene. | Isophthaloyl-bis-acetic-acid-anilide. | Vivid greenish yellow. |
| (8) | 1-amino-2-methyl-4-nitrobenzene. | Isophthaloyl-bis-acetic-acid-ortho-chloranilide. | Turbid yellow |
| (9) | α-amino-anthra-quinone. | Biphenyl-4.4'-dicarbonyl-bis-acetic-acid-anilide. | Very reddish yellow. |
| (10) | 1-amino-4-methoxy-2-nitrobenzene. | Biphenyl-4.4'-dicarbonyl-bis-acetic-acid-ortho-chloranilide. | Orange. |
| (11) | 1-amino-2-methyl-5-chlorobenzene. | Naphthoylene 1.5 - bis-acetic-acid-anilide. | Vivid medium yellow. |
| (12) | 1-amino-4-chloro-2-nitrobenzene. | Naphthoylene - 1.5 - bis-acetic-acid-ortho-chloranilide. | Reddish yellow. |
| (13) | 1-amino-4-nitro-2-methoxybenzene. | Nitroterephthaloyl-bis-acetic-acid-ortho-toluidide. | Reddish yellow. |
| (14) | 2.5-dichloro aniline. | Nitroterephthaloyl-bis-acetic-acid-ortho-anisidide. | Greenish yellow. |
| (15) | 1-amino-5-chloro-2-methylbenzene. | Chloro-terephthaloyl-bis-acetic-acid-1-chloro-2-methoxy-benzene. | Greenish yellow. |
| (16) | α-amino-anthraquinone. | Chloro-terephthaloyl-bis-acetic-acid-1-amido-4-chloro-2.5-dimethoxy-benzene. | Orange. |
| (17) | 1-amino-5-chloro-2-methylbenzene. | Terephthaloyl-bis-acetic-acid-1-amido-4-chloro-2.5-dimethoxybenzene. | Medium yellow. |
| (18) | 2.5 - dichloro - aniline. | Terephthaloyl - bis - acetic - acid - 1 - amido - 4 - chloro-2.5-dimethoxy-benzene. | Medium yellow. |
| (19) | α - aminoanthra-quinone. | Terephthaloyl - bis - acetic - acid - 1 - amido - 4 - chloro-2.5-dimethoxy-benzene. | Orange. |
| (20) | 1-amino-5-chloro-2-methylbenzene. | Terephthaloyl - bis - acetic - acid - 1 - amido - 5 - chloro - 2 - methoxy - benzene. | Greenish yellow. |
| (21) | 2.5 - dichloraniline. | Terephthaloyl - bis - acetic - acid - 1 - amido - 5 - chloro - 2 - methoxy - benzene. | Greenish yellow. |
| (22) | α - aminoanthra-quinone. | Terephthaloyl - bis - acetic - acid - 1 - amido - 5 - chloro - 2 - methoxy - benzene. | Yellowish orange. |
| (23) | 1-amino-5-chloro-2-methylbenzene. | Terephthaloyl - bis - acetic - acid - 1 - amido - 4 - chloro - 2 - methoxy-benzene. | Greenish yellow. |
| (24) | 2.5 - dichloraniline. | Terephthaloyl - bis - acetic - acid - 1 - amido - 4 - chloro - 2 - methoxy-benzene. | Greenish yellow. |
| (25) | α - aminoanthra-quinone. | Terephthaloyl - bis - acetic - acid - 1 - amido - 4 - chloro - 2 - methoxy-benzene. | Yellowish orange. |
| (26) | 1-amino-5-chloro-2-methylbenzene. | Terephthaloyl - bis - acetic - acid - 1 - amido - 3 - chloro-4-6-dimethoxy-benzene. | Greenish yellow. |
| (27) | 2.5-dichloraniline. | Terephthaloyl - bis - acetic - acid - 1 - amido - 4 - chloro - 2 - methoxy - 5 - methylbenzene. | Greenish yellow. |
| (28) | α - aminoanthra-quinone. | Terephthaloyl - bis - acetic - acid - 1 - amido - 4 - methyl - 2.5 - dimethoxybenzene. | Yellowish orange. |
| (29) | α - aminoanthra-quinone. | Terephthaloyl - bis - acetic - acid - 1 - amido - 4 - chloro - 2 -methoxy - 5 - methylbenzene. | Yellowish orange. |

We claim:

1. The water-insoluble azo-dyestuffs of the following probable general formula:

$$R'-NH-CO-CH-CO-R-CO-CH-CO-NH-R'$$
$$\underset{R''}{\overset{\underset{N}{\|}}{\underset{N}{|}}} \qquad \underset{R''}{\overset{\underset{N}{\|}}{\underset{N}{|}}}$$

wherein R and R' stand for radicals of the benzene-, naphthalene- or diphenyl-series, R'' stands for a radical of the benzene-, naphthalene- or anthracene-series, the radicals being free from sulfonic- or carboxylic acid groups, dyeing yellow to red shades and being distinguished by their good fastness properties, particularly by their good fastness to light.

2. The water-insoluble azo-dyestuffs of the following probable general formula:

$$R'-NH-CO-CH-CO-R-CO-CH-CO-NH-R'$$
$$\underset{R''}{\overset{\underset{N}{\|}}{\underset{N}{|}}} \qquad \underset{R''}{\overset{\underset{N}{\|}}{\underset{N}{|}}}$$

wherein R and R' stand for radicals of the benzene series and R'' stands for a radical of the benzene-, naphthalene- or anthracene-series, the radicals being free from sulfonic- or carboxylic acid groups, dyeing yellow to red shades and being distinguished by their good fastness properties, particularly by their good fastness to light.

3. The water-insoluble azo-dyestuff of the following probable formula:

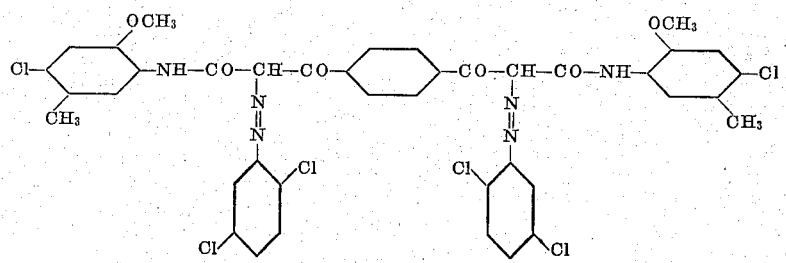

dyeing a greenish-yellow shade and being distinguished by its good fastness properties, particularly by its good fastness to light.

4. The water-insoluble azo-dyestuff of the following probable formula:

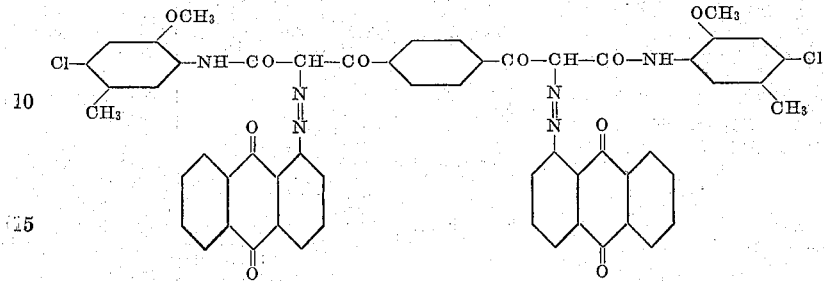

dyeing a yellowish orange shade and being distinguished by its good fastness properties, particularly by its good fastness to light.

5. The water-insoluble azo-dyestuff of the following probable formula:

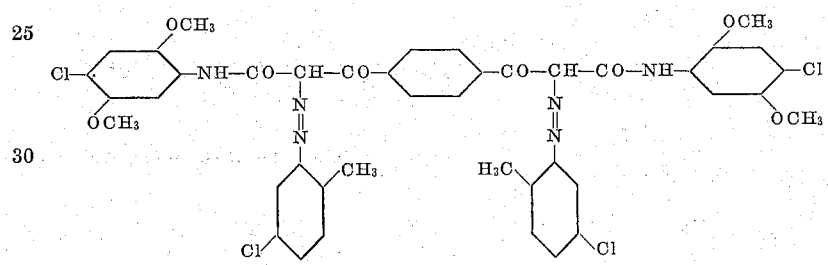

dyeing a medium yellow shade and being distinguished by its good fastness properties, particularly by its good fastness to light.

6. Fiber dyed with the dyestuffs as claimed in claim 1.

7. Fiber dyed with the dyestuffs as claimed in claim 2.

8. Fiber dyed with the dyestuff as claimed in claim 3.

9. Fiber dyed with the dyestuff as claimed in claim 4.

10. Fiber dyed with the dyestuff as claimed in claim 5.

FRANZ HENLE.
HERBERT KRACKER.